United States Patent [19]

Oppenlaender et al.

[11] 4,255,310

[45] Mar. 10, 1981

[54] AQUEOUS PAINTS WHICH CONTAIN POLYGLYCIDYLAMINES AS ADDITIVES

[75] Inventors: Knut Oppenlaender, Ludwigshafen; Rainer Strickler, Heidelberg; Hans J. Geelhaar, Frankenthal; Josef Lamprecht; Erich Penzel, both of Ludwigshafen; Gregor Ley, Wattenheim, all of Fed. Rep. of Germany

[73] Assignee: BASF Aktiengesellschaft, Ludwigshafen, Fed. Rep. of Germany

[21] Appl. No.: 65,160

[22] Filed: Aug. 9, 1979

[30] Foreign Application Priority Data

Aug. 23, 1978 [DE] Fed. Rep. of Germany ....... 2836764

[51] Int. Cl.³ ............................................ C08L 31/04
[52] U.S. Cl. ...................... 260/29.6 T; 260/29.2 EP; 260/29.6 MN; 260/29.6 CM; 260/29.7 H; 260/29.7 N; 525/6
[58] Field of Search ............................... 428/413, 483; 260/29.2 EP, 29.6 H, 29.6 MN, 29.6 TA, 29.6 CM, 29.6 T, 29.2 N, 29.6 RB, 29.7 NR, 29.7 N; 525/6; 528/418

[56] References Cited

U.S. PATENT DOCUMENTS

| 3,350,339 | 10/1967 | Sekmakas | 260/29.6 |
| 3,356,627 | 12/1967 | Scott | 260/29.6 |
| 3,515,698 | 6/1970 | Mauz et al. | 525/6 |
| 3,969,296 | 7/1976 | Wassenburg et al. | 260/29.6 TA |
| 4,089,829 | 5/1978 | Braun et al. | 260/29.6 T |
| 4,140,666 | 2/1979 | Braun et al. | 260/29.6 T |

FOREIGN PATENT DOCUMENTS 1434535 5/1976 United Kingdom .
1527616 10/1978 United Kingdom .

*Primary Examiner*—Theodore E. Pertilla
*Attorney, Agent, or Firm*—Oblon, Fisher, Spivak, McClelland & Maier

[57] ABSTRACT

Films obtained from paints based on conventional aqueous polymer dispersions exhibit improved wet adhesion to alkyd resin-coated substrates and improved blocking resistance if the paints contain polyglycidylamines which carry 2 or more glycidyl groups which are bonded to hydrogen-free nitrogens.

17 Claims, No Drawings

AQUEOUS PAINTS WHICH CONTAIN POLYGLYCIDYLAMINES AS ADDITIVES

BACKGROUND OF THE INVENTION

1. Field of the Invention

The present invention relates to an improvement in the wet adhesion and blocking resistance of paints based on aqueous polymer dispersions.

2. Description of the Prior Art

The adhesion of paint films based on aqueous polymer dispersions to smooth substrates coated with oil-based or alkyd resin-based paints which have not weathered is frequently unsatisfactory even in the dry state. Furthermore, the adhesion depends on the wetness and in general decreases with increasing wetness of the paint films. In practice, this often results in damage to the paint films and there have therefore been many attempts to improve the wet adhesion of paint films based on aqueous polymer dispersions. For example, an attempt has been made (cf. U.S. Pat. No. 3,356,627) to improve the wet adhesion by the presence of special auxiliary monomers, for example basic acrylates, eg. ureidoacrylates, as copolymerized units in the binder polymers employed. Further attempts to improve the wet adhesion of paint films have been made by copolymerization of auxiliary monomers containing glycidyl groups and subsequent reaction of the glycidyl groups with ammonia, hexamethylenetetramine or lower primary or secondary monoamines (cf. U.S. Pat. Nos. 3,350,339, 4,089,829 and 3,969,296). Finally, it has already been proposed (British Pat. No. 1,527,616) to improve the wet adhesion of paint films containing a binder polymer by introducing copolymerized units of $\alpha,\beta$-unsaturated halogen compounds into the polymers and then reacting them with ammonia or hexamethylenetetramine. The reaction of binder polymers, containing carboxyl groups, with alkyleneimines, especially ethyleneimine and 1,2-propyleneimine, is also alleged (cf. British Pat. No. 1,434,535) to improve the wet adhesion. However, the binder polymer dispersions improved by these conventional methods give paint films whose wet adhesion continues not to be fully satisfactory, and which furthermore often block. In addition, the wet adhesion of paint films prepared with such conventional binder dispersions often depends very greatly on the components, eg. pigments, additionally contained in the paints, and is sometimes difficult to reproduce.

SUMMARY OF THE INVENTION

We have found that the wet adhesion of paint films based on aqueous polymer dispersions can be improved greatly if polyglycidylamines which contain 2 or more glycidyl groups bonded to hydrogen-free nitrogens, or salts of such polyglycidylamines, which may or may not contain ether groups, are employed as additives for the aqueous paints. The polyglycidylamines are in general added to the aqueous paints in amounts of from 1 to 15 percent by weight, preferably of from 2 to 10 percent by weight, based on the binder polymer contained in the paints, ie. the polymer of the polymer dispersion. They may be added as, for example, a solution or emulsion, and the pH of the paints can in general be from 4 to 11. From the point of view of the processability of the mixtures (the pot life) the pH of the aqueous paints containing polyglycidylamines is preferably from 6 to 9, since mixtures having such a pH have a particularly long pot life.

DESCRIPTION OF THE PREFERRED EMBODIMENTS

Polyglycidylamines, having 2 or more glycidyl groups, which are of particular interest are alkyl-diglycidyl-amines, where alkyl is of 1 to 10, especially of 4, carbon atoms. Compounds which have proved particularly suitable are N-n-butyl-N,N-diglycidylamine and N-isobutyl-N,N-diglycidylamine, but also N-methyl-N,N-diglycidylamine, N-ethyl-N,N-diglycidylamine, N-n-propyl-N,N- diglycidylamine, N-tert.-butyl-N,N-diglycidylamine, N-2-ethylhexyl-N,N-diglycidylamine and N-n-decyl-N,N-diglycidylamine. Further suitable polyglycidylamines containing 2 or more glycidyl radicals are N,N'-dialkyl-N,N'-diglycidylpolymethylene-diamines which in most cases contain from 2 to 10 methylene groups and where alkyl is of 1 to 10, especially of 4, carbon atoms, eg. N,N'-dimethyl-N,N'-diglycidyl-ethylenediamine, -propylenediamine and -butylene-diamine, N,N'-diethyl-N,N'-diglycidyl-ethylenediamine and -pyropylenediamine N,N'-di-n-butyl-N,N'-diglycidyltetramethylenediamine and N,N'-di-isobutyl-N,N'-trimethylenediamine. Examples of suitable polyglycidylamines containing ether groups are those of the general formula (I)

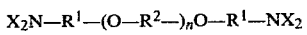

where X is

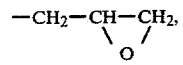

$R^1$ is alkyl or alkylene of 1 to 4 carbon atoms, $R^2$ is alkylene of 1 to 20 carbon atoms and n is from 0 to 50, which compounds may be prepared, for example, in accordance with German Laid-Open Application DOS No. 2,735,765 by reacting an ether-diamine of the general formula (II)

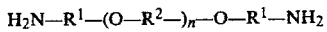

where $R^1$, $R^2$ and n have the above meanings, with epichlorohydrin at an elevated temperature.

Specific examples are tetraglycidyl-4,7-dioxadecane-1,10-diamine, tetraglycidyl-4,9-dioxadodecane-1,12-diamine, tetraglycidyl-4,7,10-trioxatridecane-1,13-diamine, tetraglycidyl-4,7,10-trioxatridecane-1,13-diamine, tetraglycidyl-4,7-dioxadecane-1,10-diamine, tetraglycidyl-4,9-dioxadodecane-1,12-diamine, tetraglycidyl-4-oxaheptane-1,7-diamine and tetraglycidyl-4,11-dioxatetradecane-1,14-diamine.

The polyglycidylamines which contain from 2 to 4 glycidyl groups are of particular interest; they in most cases contain from 0 to 4, especially from 1 to 3, ether groups.

The polyglycidylamines can be added to the aqueous paints, for example to the aqueous dispersion paints, as such, for example in solution or emulsion, or in the form of their salts. Salts of particular interest are those formed with lower dialkyl sulfates, where alkyl is of 1 to 4 carbon atoms, preferably with dimethyl sulfate. Other suitable salts are sulfates, bisulfates, acetates and formates.

According to the invention, polyglycidylamines can be added, for example, to conventional aqueous dispersion paints, preferably immediately before they are used. The binders in the paints can be the polymer dispersions conventionally used for this purpose. Examples are aqueous dispersions of homopolymers and copolymers of alkyl acrylates and/or alkyl methacrylates, where alkyl is in most cases of 1 to 10, preferably of 2 to 4, carbon atoms, especially ethyl acrylate, n-butyl acrylate, isobutyl acrylate and methyl methacrylate. Conventional comonomers for such polyacrylate dispersions are vinyl-aromatic compounds, especially styrene, vinyl esters, especially vinyl acetate and vinyl propionate, and, if desired, minor amounts of acrylonitrile, $\alpha,\beta$-monoolefinically unsaturated monocarboxylic acids and/or dicarboxylic acids, eg. acrylic acid, methacrylic acid and fumaric acid, and/or amides of such acids. Other suitable binders are aqueous dispersions of copolymers of vinyl acetate with vinyl chloride and ethylene, and aqueous dispersions of carboxylated butadiene-styrene copolymers. Such copolymers, contained in aqueous dispersion, in general have a minimum film-forming temperature of from 0 to 80° C., preferably from 15° to 50° C., and in general contain the emulsifiers and dispersants conventionally used in such dispersions. The paints or dispersion paints prepared from the copolymers in the conventional manner additionally contain conventional pigments and fillers, eg. titanium dioxide and calcite, as well as film-forming assistants, preservatives and thickeners. For the purposes of the invention, aqueous paints also include synthetic resin-bonded plasters, primers and colorless finishes, for example gloss finishes, as well as water-dilutable surface coatings. By way of example, the wet adhesion of a conventional dispersion paint to an alkyd resin film can be improved by priming the latter with a primer comprising an aqueous solution or emulsion of the polyglycidylamines or of their salts, even if the primer has already dried.

In some cases it is also advantageous to add conventional emulsifiers, especially of the type employed in the preparation of the particular binder dispersion, to the aqueous binder dispersion or aqueous dispersion paint; in most cases, from 0.5 to 5 percent by weight of emulsifier, based on the amount of the binder polymer, suffices for this purpose. Paint films produced using polyglycidylamines in accordance with the invention exhibit greatly improved wet adhesion, especially on alkyd resin substrates. The extent of improvement of the wet adhesion essentially depends on the amount of polyglycidylamine used, not on the remaining composition of the paint, ie. the wet adhesion of a paint film containing a polyglycidylamine as the additive is, for example, virtually independent of the pigment contained therein. The improvement in blocking resistance of films of aqueous dispersion paints by means of the additives according to the invention results, for example, in reduced sticking of painted doors and windows or of stacked painted articles, especially at mid-summer temperatures.

The values for the wet adhesion and the blocking of films of unpigmented aqueous polymer dispersions, given in the Examples which follow, were determined in accordance with the following tests:

A DETERMINATION OF THE DRY ADHESION AND WET ADHESION OF POLYMER DISPERSION FILMS ON ALKYD RESIN SUBSTRATES

(1) Preparation of the substrate 1 mm thick aluminum sheets are roughened to a peak-to-valley height of about 20 $\mu$m by means of an orbital sander.

These sheets are knife-coated (using a gap width of 120 $\mu$m) with a 32 cm long and 6 cm wide strip of a commercial alkyd resin (Glasurit Universalweiss EA).

After having been stored for 24 hours in a conditioning chamber at 23° C. and 50% relative atmospheric humidity, the coated sheets are dried for 5 days at 45° C. in a through-circulation dryer. After further storage for 3 to 10 days in the conditioning chamber, the substrates are ready to use.

(2) Application of the polymer dispersion

The polymer dispersion to be tested is spread with a 4 cm wide knife coater, using a gap of 250 $\mu$m, onto the previously prepared alkyd resin substrates. A 6 cm wide, wrinkle-free strip of a cotton fabric (calico) is placed, under slight pressure, in the dispersion whilst the latter is still wet, and further dispersion is applied immediately by moving a knife coater with 250 $\mu$m gap to and fro 3 times.

After drying the dispersion for 3–4 days, the edges of the test strips are cut off so as to give a strip 3.5 cm wide.

(3) Determination of the adhesion

The test strips are half immersed in water for 2 hours, and the cotton fabric is then pulled off manually or by means of a roller-peel device according to DIN 53,289 on a tensile tester. The pull-off speed is 1 m/min. The type of fracture is assessed and the peel strength measured, in each case in the water-soaked part of the test strip; the peel strength is expressed per unit width of the sample.

B BLOCKING TEST

Mixtures of polymer dispersions and polyglycidylamine, at the concentrations shown, are prepared by stirring manually or with a laboratory stirrer, and are left to stand overnight at room temperature. On the following morning, the mixtures are knife-coated onto polyvinyl chloride foils, using a box-type knife coater (gap 120 $\mu$m), and are dried for 3 minutes at 80° C. The coated samples are stored for 8 days at 23° C. and 50% relative atmospheric humidity and are then cut into pieces of size 4 cm². Pairs of the pieces are placed on top of one another, coated side onto coated side, and are kept for 16 hours between glass plates under a load of 1.5 kg/cm² at the stated temperature in a through-circulation dryer. The samples are then cooled, and are assessed after removing the load. The following figures of merit are used:

FIG. of merit 1 = Foils fall apart
FIG. of merit 2 = Foils adhere slightly
FIG. of merit 3 = Foils adhere strongly
FIG. of merit 4 = Incipient tearing-off at the edge
FIG. of merit 5 = Tearing-off in the main surface
FIG. of merit 6 = Completely torn off -continued FIG. of merit X = Stuck together, no longer separable.

In the Examples which follow, parts and percentages are by weight.

EXAMPLES 1 to 3

5 parts of a 20% strength aqueous solution of the N,N-polyglycidylamine of the formula

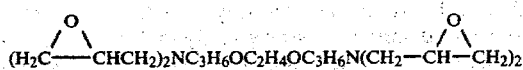

$(H_2C\overset{O}{-}CHCH_2)_2NC_3H_6OC_2H_4OC_3H_6N(CH_2\overset{O}{-}CH\overset{}{-}CH_2)_2$ or of the formula

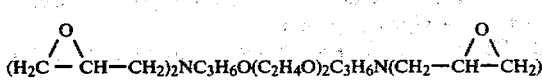

$(H_2C\overset{O}{-}CH\overset{}{-}CH_2)_2NC_3H_6O(C_2H_4O)_2C_3H_6N(CH_2\overset{O}{-}CH\overset{}{-}CH_2)_2$ are added to 100 part portions of aqueous commercial dispersions, of about 50% strength, of copolymers of
(1) 45 parts of n-butyl acrylate and 55 parts of styrene, or
(2) 60 parts of methyl methacrylate and 40 parts of 2-ethylhexyl acrylate or
(3) equal parts of methyl methacrylate and n-butyl acrylate.

The wet adhesion and the blocking resistance are determined for the above mixtures. The results are summarized in the Table which follows:

TABLE

| Dispersion mixture | Wet adhesion (kg/3.5 cm) | Blocking | FIG. of merit at T° C. |
|---|---|---|---|
| 1 A | 2.5 | 2 | 70 |
| 1 B | 3.5 | 2 | 70 |
| 2 A | 3.0 | — | — |
| 2 B | 3.1 | — | — |
| 3 A | 2.5 | 2 | 70 |
| 3 B | 1.1 | 2 | 70 |
| Comparative experiment with dispersion | | | |
| 1 | 0.1 | 6 | 50 |
| 2 | 0.1 | — | — |
| 3 | 0.1 | 6 | 40 |

The above mixtures of polymer dispersions and polyglycidylamines may be used, for example, as primers for paint films to be applied to alkyd resin substrates.

EXAMPLES 4 to 6

248 parts of the 50% strength polymer dispersion (1) or (2) or (3) are mixed in the conventional manner with 12.5 parts of water, 0.9 part of a 25% strength aqueous ammonia solution, 0.9 part of a commercial silicon-free anti-foam agent, 6.8 parts of a 25% strength aqueous solution of a low molecular weight polyacrylic acid (a commercial dispersant), 45.3 parts of propylene glycol, 124 parts of rutile, 10 parts of a 4% strength aqueous solution of a commercial medium-viscosity hydroxyethylcellulose, 8.3 parts of butyl glycol and 10 parts of N-n-butyl-N,N-diglycidylamine. Pigmented paints are obtained, which exhibit particularly good wet adhesion to old alkyd resin paint films.

By contrast, paint films obtained from the same paint composition but without glycidylamine compound, when applied to old alkyl resin paint films, disintegrate relatively rapidly under the influence of water.

EXAMPLES 7 TO 21

Paints are prepared, as described in Examples 4 to 6, using dispersions (1), (2) and (3), but employing 4 parts of one of the polyglycidylamines shown below instead of the 10 parts of N-n-butyl-N,N-diglycidylamine employed in Examples 4 to 6:

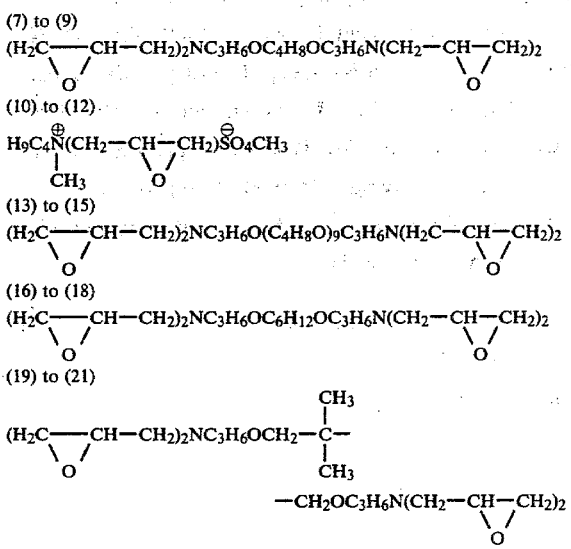

The paints were subjected to a wet adhesion test, in which they were applied with a 200 μm knife coater, as described under A above, onto the prepared alkyd resin substrate, and were then dried and each subjected to a 5-fold freeze-thaw cycle (stored for 6 hours in water at room temperature, then frozen for 16 hours at −20° C., and then thawed again). After the 5th thawing, the adhesion and blistering of the test strips were assessed; neither blistering nor detachment of the paint films was observed.

We claim:
1. An aqueous dispersion paint which comprises:
   a binder selected from the group consisting of homopolymers or copolymers or mixtures thereof; and
   1–15% by weight based on said binder, of a polyglycidylamine carrying at least two glycidyl groups bonded to hydrogen-free nitrogen or salts thereof.
2. The paint of claim 1, wherein said binder is a homopolymer or copolymer of a $C_1$-$C_{10}$ alkyl acrylate, or of a $C_1$-$C_{10}$ alkyl methacrylate, or mixtures thereof.
3. The paint of claim 1, wherein said binder is a homopolymer or a copolymer having a minimum film-forming temperature of 0°-80° C.
4. The paint of claim 3, wherein said copolymer having a film-forming temperature of 0°-80° C. is a copolymer of vinyl acetate with vinyl chloride and ethylene.
5. The paint of claim 1, wherein said copolymer having a film-forming temperature of 0°-80° C. is a carboxylated butadiene styrene copolymer.
6. The paint of claim 1, wherein said polyglycidylamines are present in an amount of 2–10% by weight.
7. The paint of claim 1, which has a pH of 4–11.
8. The paint of claim 1, wherein said polyglycidylamine is a $C_1$-$C_{10}$ alkyl-diglycidylamine.

9. The paint of claim 8, wherein said alkyl is a $C_4$ alkyl group.

10. The paint of claim 1, wherein said polyglycidylamine is selected from the group consisting of N-n-butyl-N,N-diglycidylamine, N-isobutyl-N,N-diglycidylamine, N-methyl-N,N-diglycidylamine, N-ethyl-N,N-diglycidylamine, N-n-propyl-N,N-diglycidylamine, N-tert.-butyl-N,N-diglycidylamine, N-2-ethylhexyl-N,N-diglycidylamine, and N-n-decyl-N,N-diglycidylamine.

11. The paint of claim 1, wherein said polyglycidylamine is an N,N'-dialkyl-N,N'-diglycidylpolymethylenediamine having 2–10 methylene groups.

12. The paint of claim 1, wherein said polyglycidylamine has the formula (I):

$$X_2N-R^1-(OR^2-)_nOR^1-NX_2 \quad (I)$$

wherein X is

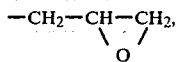

$R^1$ is a $C_1$–$C_4$ alkyl or alkylene group, $R^2$ is an alkylene of 1 to 20 carbon atoms and n is from 0 to 50.

13. The paint of claim 12, wherein the polyglycidylamine is selected from the group consisting of tetraglycidyl-4,7-dioxadecane-1,10-diamine, tetraglycidyl-4,9-dioxadodecane-1,12-diamine, tetraglycidyl-4,7,10-trioxatridecane-1,13-diamine, tetraglycidyl-4,7,10-trioxatridecane-1,13-diamine, tetraglycidyl-4,7-dioxadecane-1,10-diamine, tetraglycidyl-4,9-dioxa-dodecane-1,12-diamine, tetraglycidyl-4-oxaheptane-1,7-diamine, and tetraglycidyl-4,11-dioxatetradecane-1,14-diamine.

14. The paint of claim 1, wherein the polyglycidylamine has 2–4 glycidyl groups.

15. The paint of claim 12, wherein n in the formula (I) is 1–3.

16. The paint of claim 1, wherein the polyglycidylamines are added to the dispersion in the form of salts.

17. The paint of claim 16, wherein said salts are lower dialkyl sulfates having alkyl groups containing 1–4 carbon atoms.

* * * * *